US008903378B2

(12) United States Patent
Shah et al.

(10) Patent No.: US 8,903,378 B2
(45) Date of Patent: Dec. 2, 2014

(54) OBJECT NAVIGATION

(71) Applicants: Kunal Shah, Nashua, NH (US); Rishi Kachrani, Nashua, NH (US); Shefali Mangtani, Nashua, NH (US); Samarth Desai, Nashua, NH (US); Elisha Shah, Nashua, NH (US)

(72) Inventors: Kunal Shah, Nashua, NH (US); Rishi Kachrani, Nashua, NH (US); Shefali Mangtani, Nashua, NH (US); Samarth Desai, Nashua, NH (US); Elisha Shah, Nashua, NH (US)

( * ) Notice: Subject to any disclaimer, the term of this patent is extended or adjusted under 35 U.S.C. 154(b) by 0 days.

(21) Appl. No.: 13/749,596

(22) Filed: Jan. 24, 2013

(65) Prior Publication Data

US 2014/0206347 A1 Jul. 24, 2014

(51) Int. Cl.
*H04W 4/00* (2009.01)
*G08B 13/24* (2006.01)

(52) U.S. Cl.
CPC .................................. *G08B 13/2462* (2013.01)
USPC ...... 455/426.1; 455/41.1; 455/41.2; 455/41.3

(58) Field of Classification Search
CPC ..... H04W 4/008; H04W 4/02; G08B 13/2417
USPC .................................... 455/426.1, 41.2, 41.3
See application file for complete search history.

(56) References Cited

U.S. PATENT DOCUMENTS

| | | | | |
|---|---|---|---|---|
| 7,116,230 | B2 | 10/2006 | Klowak | |
| 7,126,470 | B2 | 10/2006 | Clift et al. | |
| 7,271,715 | B2 | 9/2007 | Aupperle et al. | |
| 7,283,047 | B2 | 10/2007 | Culpepper et al. | |
| 7,579,951 | B2 | 8/2009 | Hirahara et al. | |
| 7,848,905 | B2 | 12/2010 | Troxler et al. | |
| 7,852,222 | B2 | 12/2010 | Johnson et al. | |
| 7,948,384 | B1 | 5/2011 | Kennedy | |
| 7,961,097 | B2 | 6/2011 | Porte et al. | |
| 2006/0208925 | A1* | 9/2006 | Wassingbo | 340/990 |
| 2011/0195701 | A1* | 8/2011 | Cook et al. | 455/422.1 |
| 2011/0207429 | A1* | 8/2011 | Maier et al. | 455/404.2 |
| 2011/0300905 | A1* | 12/2011 | Levi | 455/557 |
| 2013/0029686 | A1* | 1/2013 | Moshfeghi | 455/456.1 |
| 2013/0256412 | A1* | 10/2013 | Yeh et al. | 235/439 |
| 2014/0009291 | A1* | 1/2014 | Requist et al. | 340/572.1 |

* cited by examiner

*Primary Examiner* — Barry Taylor
(74) *Attorney, Agent, or Firm* — Beacon Patent Intelligence LLC; Eugene H. Nahm

(57) ABSTRACT

The present disclosure provides a system for locating objects. The system includes a set of passive tags such that each tag is being exclusively associated with each object. The system further employs an identification module and a mobile device. Configuration of the identification module allows communication between the module and the passive tags. Further, the mobile device selectively and/or continuously processes the communication between the identification module and the passive tags.

12 Claims, 3 Drawing Sheets

OBJECT NAVIGATION

TECHNICAL FIELD

The presently disclosed embodiments relate to object navigators, and more particularly to portable object navigators for identifying objects within a predetermined range.

BACKGROUND

Misplacing an item is a very simple task, while locating one can be extremely difficult. Individuals often lose important items, such as keys, remote controls, passports, electronic devices or needed documents at locations, for example, homes, offices, and numerous other locations. They spend more time than required, attempting to locate misplaced items. Additionally, a user cannot track and further determine whether a lost item is in or away from a specific area. In certain scenarios, items even remain lost for days, causing frustration and inconvenience.

Existing devices for searching misplaced items include a combination of a paging device and a set of battery powered tags. The paging device is a self-contained remote or docking station. The tags are generally keychain sized and typically attached to an object via a keychain. However, these tags are bulky, causing difficulty in attaching the tags to the items to be tracked. In addition, the tags being battery powered might subject to power loss before identifying location of the misplaced items. Moreover, these existing devices do not offer customization feature, which corresponds to increasing the number of items to be located, labeling tags, and so on.

Generally, on activation, the paging device communicates with the tag of the item to be searched. Design of the tag allows it to respond to the paging device when the item associated with the tag has been located. Communication can be either by generating a beep or making some other noise. Some systems are configured such that either the responding tag beeps until a user locates the tag/item pair or otherwise stops the beeping after a predetermined time. Other systems are programmed such that the responding tag beeps only a predetermined number of times even if the tag/item pair has not been located. Further, typically these available systems are pre-configured from the factory/distributor end, restricting expandability and customization.

There is a growing need for a more efficient, reliable, and customizable solution to locate misplaced objects. Further, there exists a need of a system in which a user would not have to worry about battery failure before locating a misplaced object.

SUMMARY

The present disclosure provides a system for locating objects. The system includes a set of passive tags such that each tag is being exclusively associated with each object. The system further employs an identification module, configured to communicate with the passive tags. Moreover, the system includes a mobile device that is operatively coupled to the identification module. In addition, the mobile device selectively and/or continuously processes the communication between the identification module and the passive tags.

One embodiment of the present disclosure provides a system for locating objects. This system includes a set of RFID passive tags, a RFID reader, and a smartphone. Each RFID passive tag is exclusively associated with each object. Further, the RFID reader is configured to communicate with the RFID passive tags. Moreover, the smartphone being connectable to the RFID reader is operatively coupled to an instruction module. The smartphone selectively and/or continuously manages the communication between the RFID reader and the RFID passive tags.

Another embodiment of the present disclosure provides a method for locating objects. The method includes associating a passive tag exclusively with an object. The method further involves a step of allowing a mobile device to control the communication between an identification module and the passive tag. Moreover, the method includes, based on a set of instructions, selectively determining the location of the object within a predetermined range.

DETAILED DESCRIPTION

The following detailed description is made with reference to the figures. Preferred embodiments are described to illustrate the disclosure, not to limit its scope, which is defined by the claims. Those of ordinary skill in the art will recognize a number of equivalent variations in the description that follows.

As used herein, the term, "passive tag" refers to a tag that does not contain a battery, and the power is supplied by a particular reader. In the following description "passive tags" may also correspond to RFID passive tags. The RFID passive tag uses the radio energy transmitted by a reader as its energy source.

Overview

Embodiments of the present disclosure describe a system in which a mobile device is employed to locate objects by communicating with passive tags discretely attached to objects. The mobile device, operatively coupled to an identification module, tracks the location of misplaced objects within a predetermined range. In addition to the (predetermined set of objects, additional objects can be searched by customizing the system. Moreover, this system is more convenient to use because the passive tags are slim and can be attached to objects via stickers, resulting in a light object/tag pair. Additionally, as a result of employing passive tags in the system, the risk of battery failure before location identification of misplaced objects has been eliminated.

Exemplary System

Figure 1:
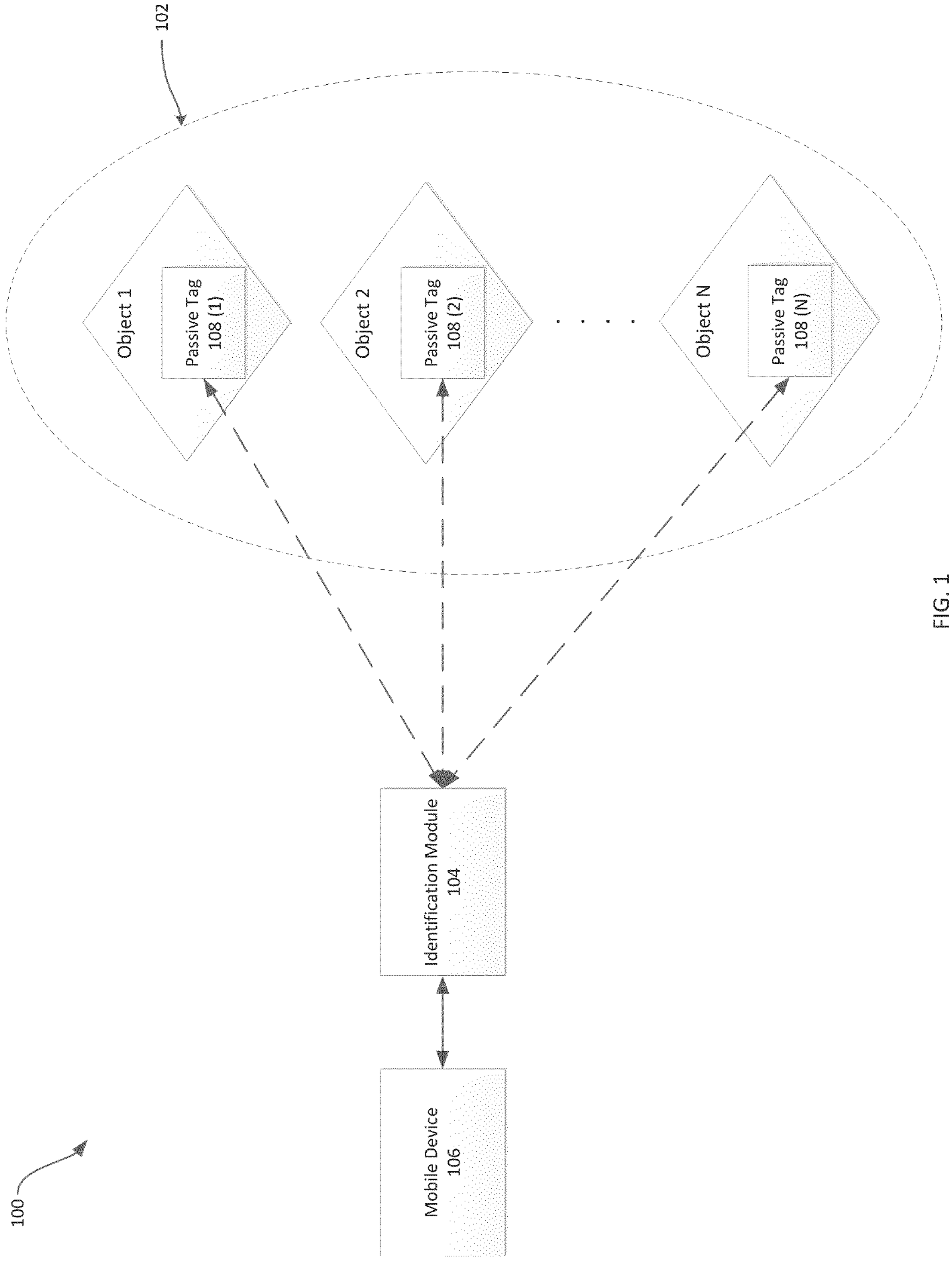
FIG. 1 schematically illustrates an exemplary system for using a mobile device to locate misplaced objects.

FIG. 1 schematically illustrates an exemplary system 100 for locating misplaced objects. The system 100 employs a series of objects 102, an identification module 104, and a mobile device 106.

The series of objects 102 may include objects ranging from 1 to N. These objects can be common household items that often get misplaced, such as keys, wallets, glasses/sunglasses, remote controls, and important documents. Alternatively, the set of objects 102 may correspond to items present in offices, and numerous other locations.

The system 100 employs a set of passive tags 108 ranging from 1 to N. Each object in the set 102 is exclusively associated with a passive tag by physically attaching the tags onto the objects. For example, passive tag 108 (1) can be attached to object 1, passive tag 108 (2) can be attached to object 2, passive tag 108 (N) can be attached to object N, and so on. Each passive tag in the set 108 is a quarter thick. Moreover, these passive tags can be attached onto the objects using sticker or other adhesive, clip, magnet, or Velcro. In an alternative implementation, the set of passive tags 108 can be passive RFID chips or some type of passive microchip.

The identification module 104 is configured to communicate with the set of passive tags 108. The identification module 104 can be an RFID reader or some other type of microchip reader. In one implementation, the magnitude of the signals being transferred between the passive tags and the identification module 104 is proportional to the distance between the two. As a result this communication is limited by the distance between the identification module 104 and the tags placed on the objects.

The mobile device 106 regulates the entire process of object navigation. Operatively coupled mobile device 106 and the identification module 104, manage the communication between the identification module 104 and the set of passive tags 108. The mobile device 106 can be a smartphone or a personal portable computing device. Further, a user may operate the mobile device 106 to search misplaced objects.

Operation of the system 100 commences when a user identifies and selects an object to be located from the series of objects 102. The mobile device 106 communicates the information of the object to be located to the identification module 104. On activation, the identification module 104 transmits a signal to interrogate the set of passive tags 108. Depending on the predetermined range, the passive tag associated with the misplaced object receives the signal, and further responds to the identification module 104 with its identification information. Post location identification, the identification module 104 sends a notification signal to the mobile device 106, indicating the object position. As a result, the user operating the mobile device 106 finds the misplaced object based on the notification signal.

Figure 2:
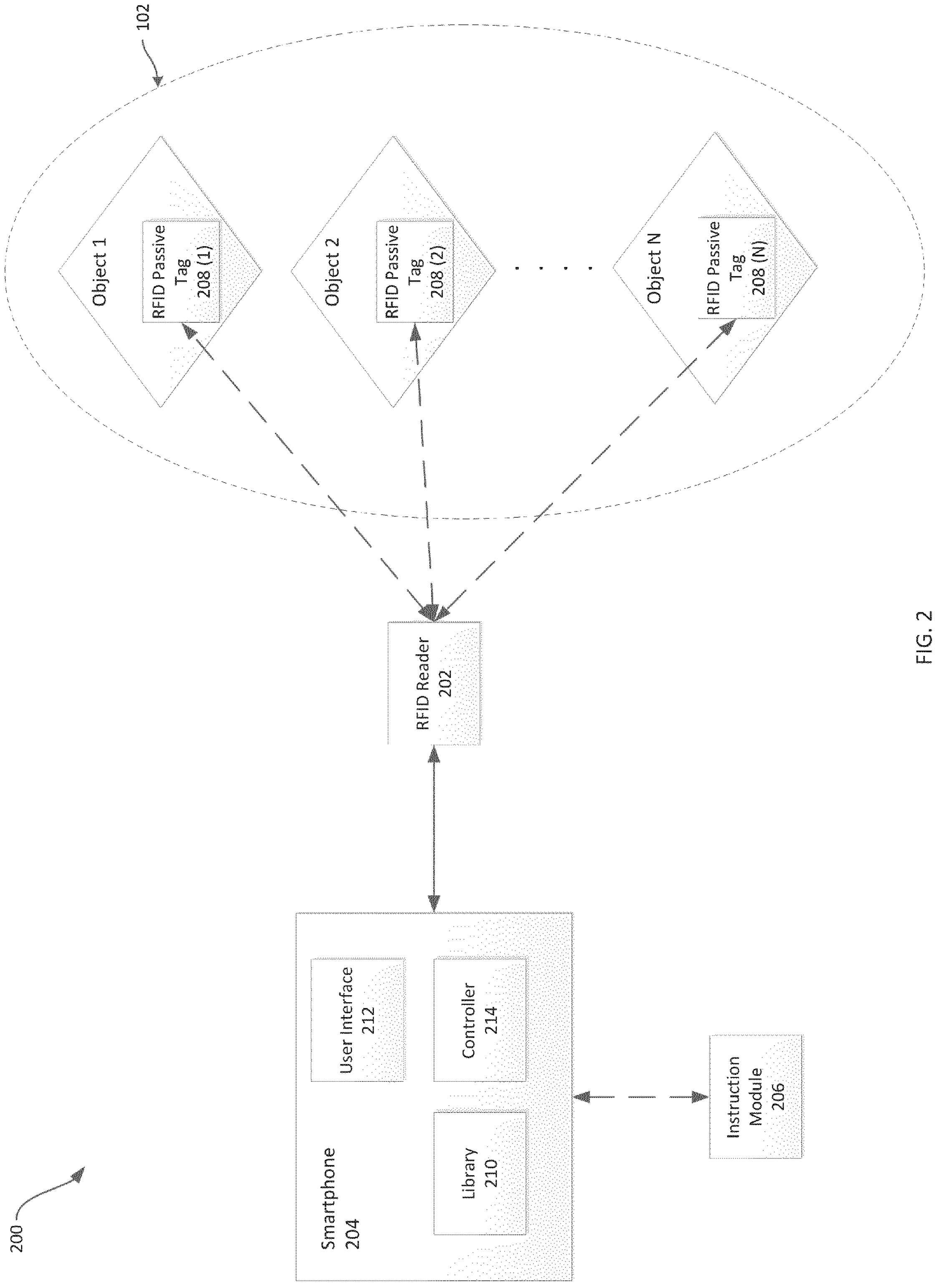
FIG. 2 illustrates a smartphone integrated system to locate misplaced objects according to an embodiment of the present disclosure.

FIG. 2 illustrates a smartphone integrated system 200 for locating misplaced objects from the set of Objects 102. The system 200 employs a RFID reader 202, a smartphone 204, and an instruction module 206.

It will be understood by those skilled in the art that the description corresponding to the set of objects 102 would be similar to description provided for the objects in FIG. 1.

The system 200 employs a set of RFID passive tags 208 ranging from 1 to N. Each object in the set 102 is exclusively associated with a RFID passive tag by physically attaching the tags onto the objects. For example, RFID passive to 208 (1) can be attached to object 1, RFID passive tag 208 (2) can be attached to object 2, RFID passive tag 208 (N) can be attached to object N, and so on. Each RFID passive tag in the set 208 is a quarter thick. Moreover, these RFID passive tags can be attached onto the objects using sticker or other adhesive, clip, magnet, or Velcro.

The RFID reader 202 is configured to communicate with the set of RFID passive tags 208. Each RFID passive tag uses the radio energy transmitted by the RFID reader 202 as its energy source. When radio waves from the RFID reader 202 are encountered by a relevant RFID passive tag, the coiled antenna within the tag forms a magnetic field. The RFID passive tag draws power from it, energizing the circuits in the RFID passive tag. Further, the RFID passive tag sends the information encoded in the tag's memory. Additionally, the magnitude of the signals being transferred between the RFID passive tags and the REID reader 202 is proportional to the distance between the two. As a result this communication is dependent on the distance between the REID reader 202 and the set of REID passive tags 208 placed on the objects. In one implementation, the RFD reader 202 can be a USB dongle.

Integration of the smartphone 204 with the system 200, allows customized object navigation. The smartphone 204 is connectable to the RFID reader 202 by connecting an adaptor (not shown) to the smartphone 204. This adaptor converts a miniature USB, micro USB, or 30 pin dock connector to a full USB port. In another embodiment, the connection between the RFID reader 202 and the smartphone 204 can be wireless. Further, the smartphone 204, selectively and/or continuously monitors the communication between the RFID reader 202 and set of the RFID passive tags 208. In an embodiment, the smartphone 204 can be an iPhone, Android smart phone, or other available smartphones.

The instruction module 206 is a distribution system including a set of instructions that may be utilized by a user upon operatively coupling the smartphone 204 with the instruction module 206. In one implementation, the instruction module 206 may be a smartphone application store. The user can download the required application on the smartphone 204 from the application store. Those skilled in the art follow the known procedures for downloading such applications. Further, the user can opt for an account creation, resulting in complete access to a cloud storage offered by the smartphone application store providers. The concept of cloud storage is well understood by anyone have skill in the art, and will not be described in detail.

As shown in FIG. 2, the smartphone 204 employs a library 210, a user interface 212, and a controller 214.

The library 210 refers to a database that maintains information related to the set of objects 102. The information includes a list of the set of objects 102, association details of each RFID passive tag with respect to each object, and editable tag names for each object/tag pair. The tag names may be arranged in alphabetical order as per the application downloaded from the application store.

The user interface 212 refers to the screen of the smartphone 204. The user interface 212 displays selectable icons representing various functions for executing specific tasks. A user can click on any icon to choose an option shown on the user interface 212. In one embodiment, the user interface 212 can be configured to display the list maintained by the library 210. To view this list, the user needs to choose an option available on the user interface 212. The user can select an object/tag pair to initiate the searching procedure of an object. In an alternative embodiment, the user can edit a tag name corresponding to any object as well as add the number of searchable objects. On adding new objects in the searchable set of objects, the smartphone 204 transfers the information related to new objects, such as object names, tag names, details of RFID passive tag association information to a cloud storage (not shown). In another implementation, several notifications are made available on the user interface 212.

The controller 214 is employed to support the communication and relationship between the REID reader 202, the smartphone 204, REID passive tags 208, and the instruction module 206. Further, the controller 214 manages selection of the object to be searched by clicking on the relevant icon on the user interface 212. The controller 214 also facilitates addition and configuration of new object/tag pairs. In addition, the controller 214 controls the application download from the smartphone application store. Control of content to be displayed on the user interface 212 is also managed by the controller 214. Content may be any generic information, such as notification signals corresponding to location identification of the object to be searched, tag information, tag names, alerts corresponding to an event when the RFID reader 202 is connected to the smartphone 204, notification signals corresponding to the position of the selected object/tag pair with respect to the predetermined range.

The system 200 operates when a user connects the RFID reader 212 with the smartphone 204. Prior to this connection, the user attaches exclusive MD passive tags onto each object. The controller 214 allows communication between the smartphone 204 and the instruction module 206. In one example, the instruction module 206 is an application store from where the user downloads a relevant application on the smartphone 204. Based on the downloaded application, the controller 214 configures the RFID reader 202 and the library 210. Further, the controller 214 allows the user to select an object from the user interface 212 for navigation. On activation, the RFID reader 202 generates a signal for identifying the relevant RFID passive tag. The RFID passive tag corresponding to the object being searched responds to this signal, notifying the location identification of the object. Moreover, the position of the object is displayed on the user interface 212.

Figure 3:
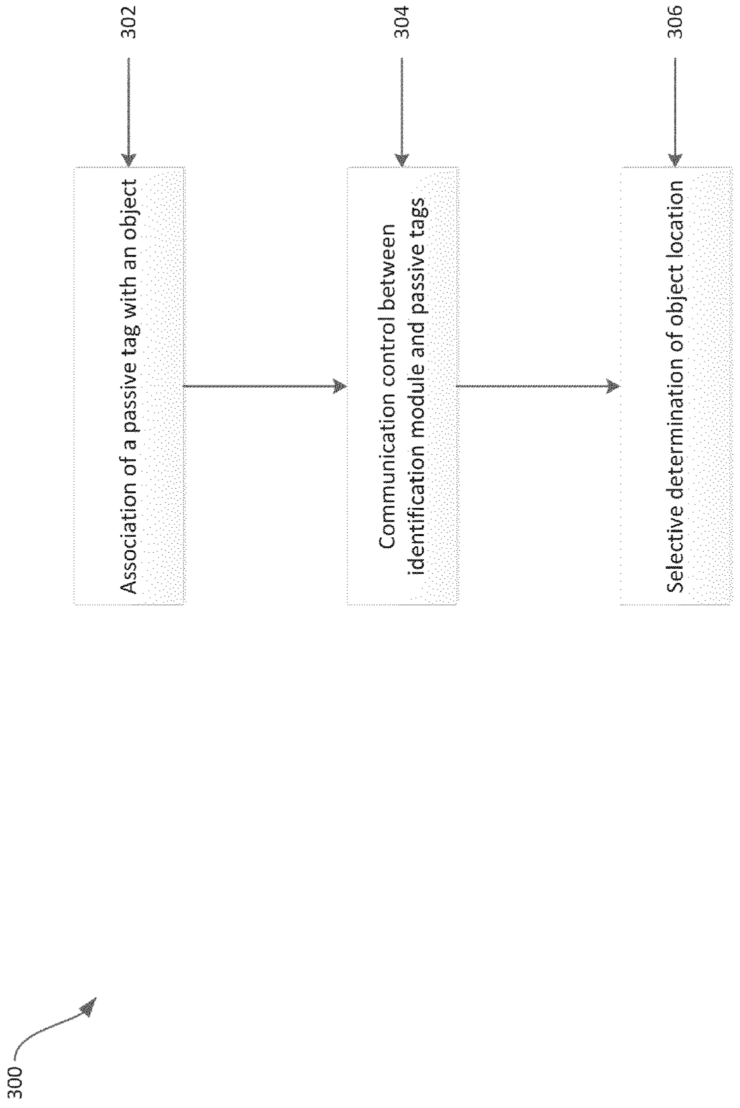
FIG. 3 is a flowchart exemplifying a method for locating misplaced objects.

FIG. 3 is a flowchart exemplifying a method 300, implementing the system 100 for locating an object. At step 302, a passive tag is exclusively associated with an object. This step involves attaching of a single passive tag onto a single object.

At step 304, a mobile device 106 controls the communication between an identification module 104 and the passive tags. This step involves configuration of the identification module 104 such that on activation, the identification module 104 generates a signal for determining the object location. Moreover, an object can be selected for searching its location, followed by sending the information related to the selected object to the identification module 104.

At step 306, location of the selected object is determined. This step includes generation of a notification signal whenever the selected object is within the predetermined range. The mobile device 106 receives this notification signal along with the object position.

The terminology used herein describes particular embodiments only; considerable variation is anticipated in implementation. It will be appreciated that several of the disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for locating a plurality of objects, the system comprising:

a plurality of passive tags such that each of the plurality of passive tags is associated with each of the plurality of objects, each of the plurality of passive tags comprising a memory;

an identification module configured to communicate with the plurality of passive tags, wherein each of the plurality of passive tags transmits an identification information stored in the memory to the identification module, the identification information comprising tag identification, association details configurable by a user, and editable tag name, the association details comprising information related to each of the plurality of objects;

a mobile device operatively coupled to the identification module, configured to selectively process the communication between the identification module and the plurality of passive tags; and a library operatively coupled to the mobile device, wherein the library comprises an object information configurable by the user, the object information comprising a list of the plurality of objects, the association details of each of the plurality of passive tags, and the editable tag name corresponding to each of the plurality of passive tags, wherein the library is configurable through a user interface.

2. The system of claim 1, wherein each of the plurality of passive tags is a passive RFID tag.

3. The system of claim 1, wherein the identification module is a RFID reader.

4. The system of claim 1, wherein the mobile device is a smartphone.

5. A system for locating a plurality of objects, the system comprising:

a plurality of RFID passive tags, such that each of the plurality of RFID passive tags is associated with each of the plurality of objects, each of the plurality of RFID passive tags comprising a memory;

a RFID reader configured to communicate with the plurality of RFID passive tags, wherein each of the plurality of RFID passive tags transmits an identification information stored in the memory to the RFID reader, the identification information comprising tag identification, association details configurable by a user, and editable tag name, the association details comprising information related to each of the plurality of objects;

a smartphone connectable to the RFID reader, wherein the smartphone is operatively coupled to an instruction module, configured to selectively process the communication between the RFID reader and the plurality of RFID passive tags; and a library operatively coupled to the smartphone, wherein the library comprises an object information configurable by the user, the object information comprising a list of the plurality of objects, the association details of each of the plurality of RFID passive tags, and the editable tag name corresponding to each of the plurality of RFID passive tags, wherein the library is configurable through a user interface.

6. The system of claim 5, wherein the RFID reader is connectable to the smartphone via a USB port/converter.

7. The system of claim 5, wherein the smartphone includes the user interface to display the object information.

8. The system of claim 7, wherein the smartphone includes an integrated controller to regulate the operation of the user interface.

9. The system of claim 8, wherein the integrated controller operatively couples the smartphone to the instruction module.

10. A method for locating a plurality of objects using a mobile device, the method comprising:

associating a passive tag exclusively with each of the plurality of objects;

configuring an identification information of the passive tag, the identification information comprising tag identification, association details of the passive tag and an editable tag name corresponding to the passive tag, the association details comprising information related to each of the plurality of objects, and the identification information being stored in a memory of the passive tag;

receiving an object information related to each of the plurality of objects, wherein the object information comprises the association details and the editable tag name, the object information being stored in a library operatively coupled to the mobile device;

allowing the mobile device to control the communication between an identification module and the passive tag;

identifying each of the plurality of objects based on the association details from both the identification information and the object information; and selectively determining the location of each of the plurality of objects within a predetermined range based on a set of instructions.

11. The method of claim 10, further including the step of selecting each of the plurality of objects for searching its location.

12. The method of claim 10, wherein the location determination step includes notifying the location of each of the plurality of objects when it is within the predetermined range.

* * * * *